US005692434A

United States Patent [19]

Vrouwenvelder

[11] Patent Number: 5,692,434
[45] Date of Patent: Dec. 2, 1997

[54] CASE FOR TEMPORARILY STORING PIECES OF DOUGH

[75] Inventor: Curinus Cornelis Vrouwenvelder, 's-Hertogenbosch, Netherlands

[73] Assignee: Johan Hendrik Bernard Kaak, Gaanderen, Netherlands

[21] Appl. No.: 614,167

[22] Filed: Mar. 4, 1996

Related U.S. Application Data

[63] Continuation of Ser. No. 547,069, Oct. 23, 1995, abandoned.

[30] Foreign Application Priority Data

Oct. 26, 1994 [NL] Netherlands ............................ 9401778

[51] Int. Cl.$^6$ ............................ A21B 1/42; A21C 9/08; A21C 11/00; A47J 27/14
[52] U.S. Cl. ............................ 99/477; 99/386; 99/443 C; 99/478; 198/370.05; 198/713
[58] Field of Search ............................ 99/467, 468, 473–476, 99/477–479, 386, 443 C, 443 R; 198/370.05, 713; 414/797.5, 797.2, 93.3; 221/251; 425/332–335, 363, 321, 364 R, 713–715

[56] References Cited

U.S. PATENT DOCUMENTS

| 3,561,373 | 2/1971 | Sievert | 99/443 R |
|---|---|---|---|
| 3,699,899 | 10/1972 | Schiffmann et al. | 99/333 |
| 3,842,293 | 10/1974 | Allen et al. | |
| 3,858,732 | 1/1975 | Kemper | 414/797.5 |
| 3,931,759 | 1/1976 | Hayashi | 99/468 |
| 4,023,476 | 5/1977 | Burgess, Jr. | 99/478 X |
| 4,124,305 | 11/1978 | Benier | 425/332 |
| 4,286,939 | 9/1981 | Benier | 425/333 |
| 4,565,277 | 1/1986 | Benier | 198/370.05 |
| 4,726,766 | 2/1988 | Stewart et al. | 99/443 C |
| 4,793,473 | 12/1988 | Gilgore et al. | 99/479 X |
| 4,882,891 | 11/1989 | Bacigalupe et al. | 99/479 |
| 5,010,808 | 4/1991 | Lanham | 99/443 C |
| 5,129,805 | 7/1992 | Vrouwenvelder | 425/335 X |

FOREIGN PATENT DOCUMENTS

| 21 09 363 | 9/1972 | Germany . |
| 8 700 439 | 9/1988 | Netherlands . |
| 291422 | 6/1927 | United Kingdom . |
| 912057 | 12/1962 | United Kingdom . |

Primary Examiner—Timothy F. Simone
Attorney, Agent, or Firm—Beveridge, DeGrandi, Weilacher & Young, L.L.P.

[57] ABSTRACT

Case for temporarily storing pieces of dough, comprising a first continuous conveying apparatus and an identical second continuous conveying apparatus. Each transport apparatus is supported by reversing rollers at the location of which the conveying direction of the conveying apparatus changes. The reversing rollers of the first and second conveying apparatus are opposite each other as pairs. The case further contains carrying members with two ends, in which the one end is attached at a first attachment point to the first conveying apparatus and the other end at a second attachment point to the second conveying apparatus. The first and second attachment points are opposite each other. The case also contains dough trays for containing pieces of dough, in which each dough tray is attached to a carrying member. According to the invention the case is provided with means for changing the position of the dough trays between two successive pairs of reversing rollers from a first position into a second position and vice versa.

19 Claims, 2 Drawing Sheets

CASE FOR TEMPORARILY STORING PIECES OF DOUGH

This application is a continuation of application Ser. No. 08-547,069, filed Oct. 23, 1995 now abandoned.

The invention relates to a case for temporarily storing pieces of dough, comprising a first continuous conveying apparatus and an identical second continuous conveying apparatus which is opposite the first one, in which each conveying apparatus is supported by reversing rollers at the location of which the conveying direction of the conveying apparatus changes, in which the reversing rollers of the first and second conveying apparatus are opposite each other as pairs, carrying members with two ends, in which the one end is attached at a first attachment point to the first conveying apparatus and the other end at a second attachment point to the second conveying apparatus, in which the first and second attachment points are opposite each other, and dough trays for containing pieces of dough, in which each dough tray is attached to a carrying member.

A suchlike case is known from the German Auslegeschrift 2.109.363. Here a proofer case is described in which during the passage through the proofer case the dough trays take up another position each time after passing a pair of reversing rolls, so that the pieces of dough are rolled into the dough trays in order to cause the fluids present in the dough to be uniformly distributed, this leading to a reproducible end product. Although this known proofer case works relatively satisfactorily, it appears that in actual practise the uniform distribution of the fluids in the pieces of dough leave much to be desired and that moreover the structure particularly of the outer layer of the pieces of dough does not always meet the requirements.

It is an object of the present invention to provide a case for temporarily storing the pieces of dough, such as a proofer case, a cooling or a buffer case, in which the uniform distribution of fluids in the pieces of dough and the structure of the pieces of dough are improved during the stay in the case as opposed to the stay in the known case.

For this purpose a case of the kind described in the preamble is characterized according to the invention in that the case is provided with means for changing the position of the dough trays between two successive pairs of reversing rollers from a first position into a second position and vice versa. The invention is based on the insight that the number of times that a dough tray changes position in the known case depends on the number of pairs of reversing rollers and the conveying velocity of the conveying apparatuses. Because of this it can occur that a piece of dough acquires such a non-uniform structure, while staying between two reversing rollers, that it can no longer be corrected by rolling over after the reversing rollers have been passed. According to the invention the means make it possible to turn the dough trays, with therein the pieces of dough, as often as desired between two successive pairs of reversing rollers from the first position to the second position, as a result of which a very uniform and reproducible form of the pieces of dough is acquired.

Preferably the means are formed by two stop means placed on both sides of the first attachment point defining a first line, by two stop means placed on both sides of the second attachment point defining a second line perpendicular to the first line, and by guides near the first and second conveying apparatuses for changing the position of the dough trays by contacting the stop means. Such means are mechanically simple to arrange on and to integrate in the case.

If the stop means are formed by rollers, wear as result of friction during contact between stop means and guides is small.

Preferably the dough trays are detachably attached to the carrying members. This simplifies the servicing of the dough trays and permits an exchange with other types of dough trays.

If the dough trays have a ω-shaped cross section, the pieces of dough contained therein are optimally rolled over during the change of the dough tray position to provide a uniform, almost cylindrical piece of dough. This ω-shape also offers an optimal support for the piece of dough while it is in the case. Moreover, by this the case is divided into two compartments, so that the opportunity of covering each compartment with another material is given. Preferably a compartment is provided with a material with a high moisture absorption capacity, in which compartment the dough is kept for a short while and the other compartment is provided with a material which does not absorb moisture, in which the dough is kept for a longer period, so that the other compartment has time to dry.

In order to avoid adverse effects on the dough structure as a result of the pieces of dough adhering to the side walls or the carrying parts, these side walls and the carrying parts are generally made of a material which does not adhere to dough. Despite the use of this sort of material the adverse effect of this adhering is shown when the pieces of dough are rolled over in the dough trays. According to the invention this adverse effect is avoided further if the sidewalls of the dough trays are made of a material which adheres to a lesser extent to dough than the material of which the carrying parts of the dough trays are made.

Some exemplary embodiments of a case for temporarily storing pieces of dough according to the invention will now be discussed, by way of example, on the basis of the drawing, in which

DESCRIPTION OF THE PREFERRED EMBODIMENT

Figure 1:
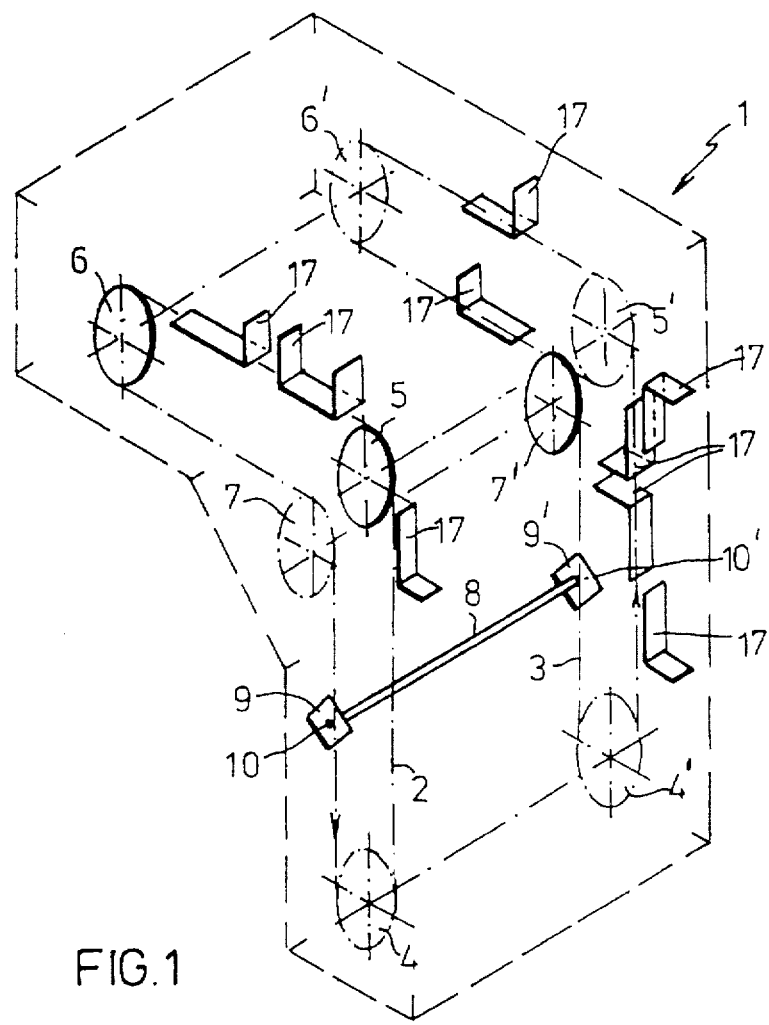
FIG. 1 shows, schematically in perspective, a case according to the invention.

FIG. 1 schematically and in perspective shows a case 1, such as a proofer case, a cooling or buffer case for temporarily storing pieces of dough. The case 1 comprises a first 2 and an identical second 3 continuous conveying apparatus opposite the first one. The conveying apparatuses can be made of chains, conveyors or lines. Each conveying apparatus 2, 3 is supported by reversing rollers 4, 5, 6, 7 and 4', 5', 6', 7', respectively, which are opposite each other as pairs. At the location of each reversing roller the conveying apparatuses change their conveying direction. In addition, the case 1 comprises carrying members, one 8 of which is shown in FIG. 1 having two ends 9, 9'. The one end is attached at a first attachment point 10 to the first conveying apparatus 2 and the other end 9' at a second attachment point 10' to the second conveying apparatus 3. The first 10 and the second 10' attachment points are opposite each other. The attachment of the carrying members 8 to the conveying apparatuses 2, 3 is a freely suspending attachment, in other words an attachment by which the position of the carrying members does not change when passing a reversing roll, as is shown in FIG. 2 on the basis of the two lower carrying members.

Figure 3:
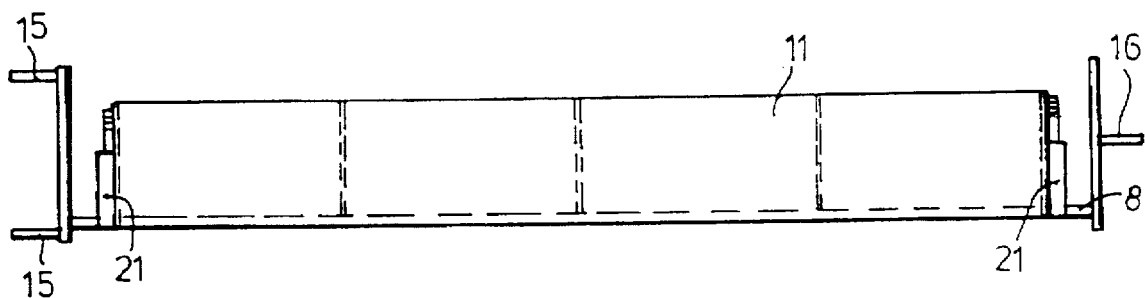
FIG. 3 shows, schematically in front view, a dough tray with a carrying element for use in a case according to the invention.
Figures 2, 4:
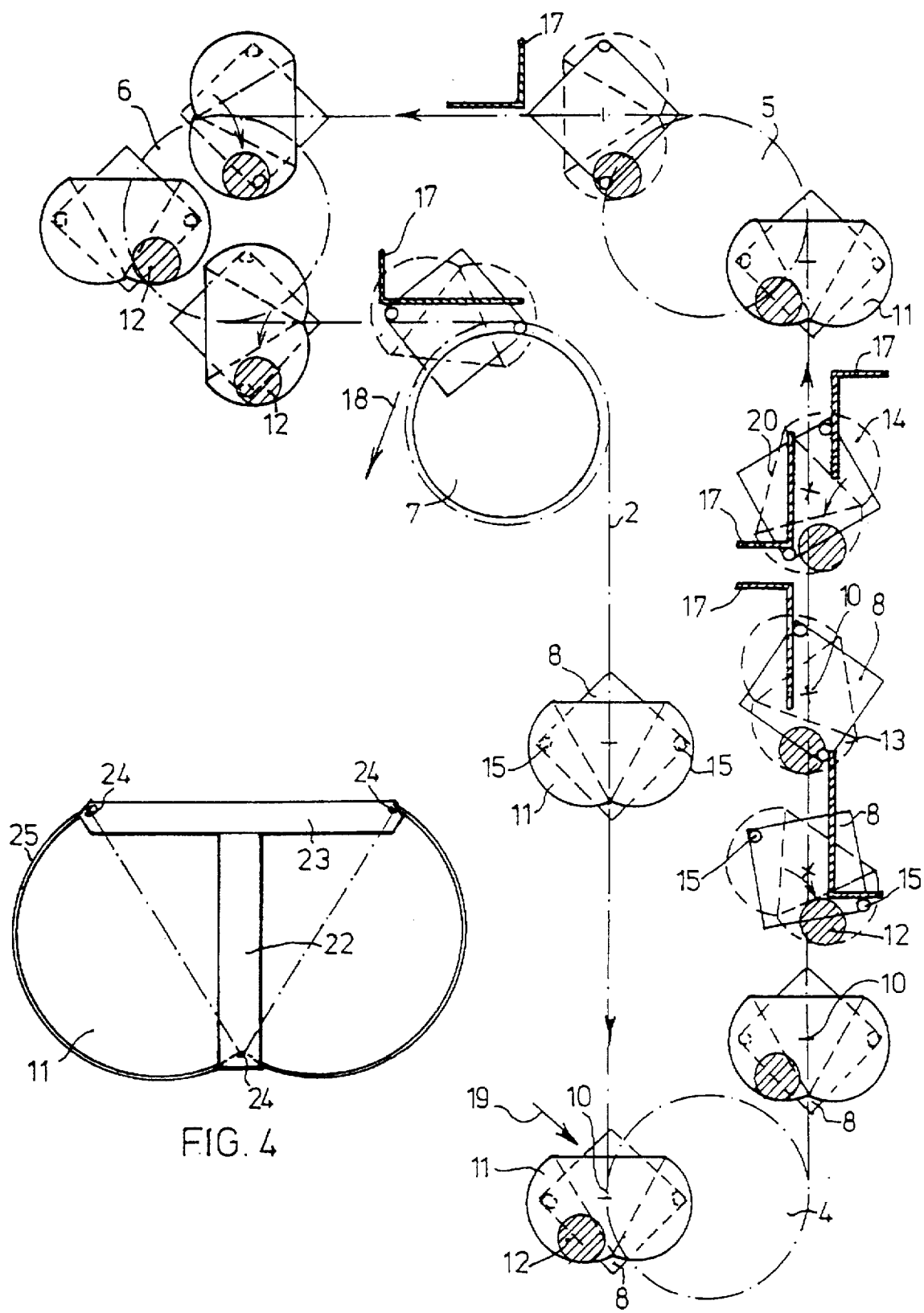
FIG. 2 shows schematically, in side view and partially in cross section, the case according to FIG. 1.
FIG. 4 shows, schematically, a side view of the dough tray according to FIG. 3.

FIG. 2 shows a part of the case of FIG. 1 in side view. Dough trays 11 for containing pieces of dough 12 are attached to the carrying members 8. In order to avoid that the structure of the pieces of dough are negatively effected while staying in the case, the case is provided with means for changing the position of the dough trays between two sucessive pairs of reversing rollers from a first position 13 into a second position 14 and vice versa. The means are preferably formed by mechanical members, such as two stop means 15, placed on both sides of the first attachment point 10, two stop means 16 placed on both sides of the second attachment point 10' (FIG. 3), and by guides 17 near the first and second conveying apparatuses 2, 3. The stop means 15 define a first line which is perpendicular to the second line defined by the stop means 16. As a result of the contacting of the stop means against the guides 17 occurring during the movement of the conveying apparatuses 2, 3, the position of the dough trays 8 changes between the first and the second positions, as is shown in FIG. 2. Wear as a result of friction during the contact between the stop means and the guides is limited if the stop means are made as rollers, although the use of stop pins of hard metal or hard plastic is, of course, also possible.

If so desired the dough trays can be turned by providing the guides. In that way it is also possible, for example, to turn the dough tray just before the discharge 18 of the dough pieces from the case, so as to loosen the pieces of dough from the dough trays if necessary. In this way turning is independent of the conveying velocity of the conveying apparatuses and the number of reversing rollers.

In the example shown the feed 19 of the pieces of dough takes place at the bottom of the case. An additional result of frequent rolling over of the pieces of dough is that the pieces of dough acquire an almost cylindrical shape, which is conducive to the further processing of the pieces of dough.

To prevent the pieces of dough from falling out of the dough trays when not so desired, and to provide a sufficiently large carrying surface for the pieces of dough, the means for turning the dough trays are arranged in such a way that the opening 20 of each dough tray in the first and second farthest positions 13, 14 is at an angle to the horizontal which is smaller than 90°, preferably an angle between 50° and 80°.

Preferably the dough trays 11 are detachably attached to the carrying members, with the help of attachment members 21 which are attached to the carrying members and attachment members 22 which are attached to the dough trays 11 (FIG. 4). In this way exchanging the dough trays for servicing and exchanging for another type of tray is possible, even when the case is in working. To simplify the removal of the dough trays 11, the dough trays 11 can have a thickened edge 23, as is shown in FIG. 4.

Although the dough trays can have all sorts of shapes, for example a C-shape, it has been shown that an ω-shaped dough tray lends the piece of dough a uniform structure and a cylindrical shape, irrespective of the size of the piece of dough accommodated therein. Moreover, the ω-shape provides each dough tray with two compartments, in which each compartment can be covered with another material, in order to realize the desired effects, for example together with adapted turning times. In that way good drying of the dough can be realized, for example, by providing the one compartment with material with high moisture absorbing capacity and the other compartment with material which is not moisture absorbing, and by adjusting the turning times in such a way that the dough stays for a short time in the one and a long time in the other compartment.

To prevent sticking or adhering of the pieces of dough to the side walls or the carrying parts of the dough trays, the side walls of the carrying parts are made of a material which adheres only slightly or not at all to dough. Suitable materials are, for example, cotton, teflon, felt, teflon felt, polythene and the like. In order to prevent that the side walls and the carrying parts adversely effect the structure of the pieces of dough during frequent rolling over, according to the invention the side walls are made of a material, for example teflon felt, which adheres less to dough than the material of which the carrying parts of the dough trays are made, for example cotton gauze. A dough tray of that kind can be made by covering, for example, ω-shaped side walls with teflon felt and cotton gauze 25 on the edges of the side walls and to attach rods 24, as is shown in FIG. 1.

The invention claimed is:

1. Case for temporarily storing pieces of dough, comprising a first continuous conveying apparatus and an identical second continuous conveying apparatus which is opposite the first one, in which each conveying apparatus is supported by reversing rollers at the location of which the conveying direction of the conveying apparatus changes, in which the reversing rollers of the first and second conveying apparatus are opposite each other as pairs, carrying members with two ends, in which the one end is attached at a first attachment point to the first conveying apparatus and the other end at a second attachment point to the second conveying apparatus, in which the first and second attachment points are opposite each other, and dough trays-for containing pieces of dough, in which each dough tray is attached to a carrying member, characterized in that the case is provided with means for changing the position of the dough trays between two successive pairs of reversing rollers from a first position into a second position and vice versa, for turning the dough trays between two successive pairs of reversing rollers as often as desired.

2. Case according to claim 1, characterized in that the means are formed by two stop means placed on both sides of the first attachment point which define a first line, by two stop means placed on both sides of the second attachment point which define a second line perpendicular to the first line, and by guides near the first and second conveying apparatusses for changing the position of the dough trays by contacting the stop means.

3. Case according to claim 2, characterized in that the stop means are formed by rollers.

4. Case according to claim 1, characterized in that the dough trays are detachably attached to the carrying members.

5. Case according to claim 1, characterized in that the dough trays have a ω-shaped cross section, as a result of which each dough tray has two compartments.

6. Case according to claim 5, characterized in that the walls of one of the compartments which walls face towards the dough, are covered with a material with a high moisture absorption capacity.

7. Case according to claim 1, characterized in that the walls facing towards the dough are covered with a material which does not adhere to dough.

8. Case according to claim 7, characterized in that the the side walls of the dough trays are made of a material which adheres less to dough than the material out of which the bearing parts of the dough trays are made.

9. Case according to claim 3, characterized in that the dough trays are detachably attached to the carrying members.

10. Case according to claim 2, characterized in that the dough trays are detachably attached to the carrying members.

11. Case according to claim 10, characterized in that the dough trays have a ω-shaped cross section, as a result of which each dough tray has two compartments.

12. Case according to claim 2, characterized in that the dough trays have a ω-shaped cross section, as a result of which each dough tray has two compartments.

13. Case according to claim 3, characterized in that the dough trays have a ω-shaped cross section, as a result of which each dough tray has two compartments.

14. Case according to claim 4, characterized in that the dough trays have a ω-shaped cross section, as a result of which each dough tray has two compartments.

15. Case according to claim 2, characterized in that the walls facing towards the dough are covered with a material which does not adhere to dough.

16. Case according to claim 3, characterized in that the walls facing towards the dough are covered with a material which does not adhere to dough.

17. Case according to claim 4, characterized in that the wall facing towards the dough are covered with a material which does not adhere to dough.

18. Case according to claim 5, characterized in that the walls facing towards the dough are covered with a material which does not adhere to dough.

19. Case according to claim 6, characterized in that the walls facing towards the dough are covered with material which does not adhere to dough.

* * * * *